United States Patent [19]

Oeste et al.

[11] Patent Number: 5,520,482
[45] Date of Patent: May 28, 1996

[54] BARRIER TO PREVENT SPREAD OF SOIL CONTAMINATION

[75] Inventors: Franz D. Oeste, Kirchhain; Joachim Kempfert, Kronberg, both of Germany

[73] Assignee: Rutgerswerke Aktiengesellschaft, Germany

[21] Appl. No.: 419,727

[22] Filed: Apr. 10, 1995

[30] Foreign Application Priority Data

Apr. 19, 1994 [DE] Germany ............... 44 13 518.1
Dec. 9, 1994 [DE] Germany ............... 44 43 828.1

[51] Int. Cl.$^6$ ....................................... B09B 3/00
[52] U.S. Cl. ................... 405/52; 405/128; 405/263; 405/264
[58] Field of Search ............... 405/52, 128, 129, 405/263, 264; 588/259

[56] References Cited

U.S. PATENT DOCUMENTS

| | | | |
|---|---|---|---|
| 2,916,853 | 12/1959 | Latourette et al. | 405/264 X |
| 3,300,984 | 1/1967 | Armentrout | 405/263 |
| 4,637,462 | 1/1987 | Grable | 405/129 X |
| 4,651,824 | 3/1987 | Grable | 405/129 X |
| 4,913,586 | 4/1990 | Gabbita | 405/129 |
| 5,002,431 | 3/1991 | Heymans et al. | 405/128 |
| 5,370,478 | 12/1994 | Bartlett et al. | 405/128 |
| 5,372,462 | 12/1994 | Sydansk | 405/264 |

FOREIGN PATENT DOCUMENTS

| | | |
|---|---|---|
| 2602011 | 7/1977 | Germany . |
| 749662 | 5/1956 | United Kingdom . |
| 2255556 | 11/1992 | United Kingdom . |

*Primary Examiner*—George A. Suchfield
*Attorney, Agent, or Firm*—Bierman and Muserlian

[57] ABSTRACT

A soil barrier to prevent the spread of harmful substances in the soil or ground water based on humic substances precipitated in the soil and a process for its creation.

5 Claims, No Drawings

BARRIER TO PREVENT SPREAD OF SOIL CONTAMINATION

STATE OF THE ART

German patent application No. P 42 42 682.0 describes a barrier for preventing the spread of harmful substances present in the soil or ground water which is a vertically oriented ocher barrier which is preferably disposed downstream of the point of contamination. This ocher barrier is generated so that one or more oxidizing agents as well as potentially Fe-(II) and/or Mn-(II) salts are introduced downstream of the contamination focus into the ground to a depth corresponding at least to the depth into which the harmful substances have penetrated until a sorptive and/or hydraulic blocking effect is attained. The ocher barrier effects a very good seal, but has the disadvantage that it is only stable in the presence of a positive redox potential, i.e. it requires oxygen-containing ground water or an anaerobic ground water must be continuously charged with an oxidizing agent (oxygen).

OBJECTS OF THE INVENTION

It is an object of the invention to provide a soil barrier which can be generated in situ to avoid the spread of harmful substances in the soil or ground water which is independent of the redox potential or oxygen content of the ground water.

It is another object of the invention to provide a process for the preparation of a soil barrier having the advantages of the prior art ocher barrier without its disadvantages.

These and other objects and advantages of the invention will become obvious from the following detailed description.

THE INVENTION

The soil barrier of the invention to prevent the spread of harmful substances in the soil or ground water is based on humic substances precipitated in the soil.

It has been found that the contaminated region of contaminated soil is perfectly bound against the down-stream ground water by an aligned barrier of humic substance and that at this humic substance barrier, the enhanced degradation of harmful substances take place through microorganisms which establish themselves there.

The barrier of humic substance is preferably generated in such a way that it is still hydraulically permeable. The surface over the contaminated region does not need to be sealed. Moreover, the barrier of humic substance is active in terms of sorption, biomineralization and humification and therefore leads to the water penetrating through being largely freed of harmful substances.

The solubility of the precipitated humic substances is not affected by redox potentials of any type and they are insoluble within the range of natural conditions independently of the pH-value. Accordingly, the barriers comprising humic substances are stable independently of the type of the ground water and its redox potential.

The humic substance barrier is preferably oriented vertically with respect to the direction of flow of the ground water and disposed down-stream of the contamination focus. Instead of an implementation in one plane, the barrier can also be disposed in the form of a horse shoe about the contamination focus with the opening on the side towards the in-flowing ground water or it can encompass the contamination source in all directions.

The pore structure of the aquifer which, as a rule, is non-homogeneous causes a non-homogeneous profile of the flow rate of the ground water. The humic substance barrier is generated accordingly offset and it is generated in the aquifer layers having a high flow rate further removed from the injection site, whereas it is preferably generated closer to the injection site in layers with a low flow rate.

The generation of the humic substance barriers of the invention takes place by introducing an aqueous huminate solution into the soil and subsequent precipitation of the humic substances. This precipitation takes place by introducing an acid or an acid salt solution into the soil mixed with the huminate solution. Since it is known to one skilled in the art that humic substances are dissolved as huminates in aqueous or alkaline solution, but are again precipitated by acids as humic substances (humic acids) insoluble in water, it is not surprising that this precipitation can also take place in the soil. However, it is surprising that the huminate solution can be introduced into a ground water stream and the precipitation of the humic substances can also be attained if the acid is introduced offset in time. This means that with the same devices, successively the huminate solution and the acid or acid salt solution can be introduced into the soil through which flows ground water and the precipitation of the humic substances and, consequently, the formation of the humic substance barriers takes place.

The humic substance barrier is preferably generated thereby that down-stream and/or up-stream and/or in the contamination center of a contamination focus an aqueous huminate solution is introduced into the ground water conduit. The huminate solution and the acid or acid salt solution is preferably introduced over the entire thickness of the contaminated ground water conduit, thus from the bottom of the ground water conduit up to the ground water table or the top of the ground water conduit. The introduction of the solutions preferably takes place uniformly over the length of the barrier to be generated.

The huminate solution is preferably introduced into the soil through perforated injection pipes largely inserted vertically into the ground water conduit. Preferably, after the huminate solution has been washed from the filter pipes through the ground water into the natural ground water conduit, an aqueous environmentally-friendly acid or acid salt solution is introduced through the same filter pipes, preferably in stoichiometric quantities relative to the previously infiltrated quantity of huminate.

It has surprisingly been found that, in spite of the time delayed addition of the acid or acid salt solution into the flowing ground water stream, already after a short travelling distance of the huminate solution, precipitation of the humic substances through reaction of the dissolved huminate with the acid occurs. This can only be explained in that the flow rate of the huminate ions in the ground water is slower than that of the acid ions so that during the "passing process" of the front of the huminate ions by the front of the acid ions, the reaction between huminate and acid for the precipitation of the humic acid takes place. The humic acid is therein fixed as a fine precipitate on the solid aquifer phase while the neutralization product in the form of dissolved salts is carried away with the ground water.

The flow rate of the ground water and the time difference, selected as a function of the flow rate of the ground water, between huminate filtration and acid filtration is essentially decisive for the site in the down-stream ground water aquifer at which the humic substance barrier is generated if the aquifers contain similar grain sizes and contents of organic substances. But it is advantageous to test experimentally the retardation of the huminate solution in the aquifer with respect to the flow rate of the ground water. This is accomplished by filling in loose rocks removed from the aquifer into a glass column, compacted under water and in the submerged state, water is slowly passed through it at a rate which corresponds to the flow rate of the ground water. Subsequently, at a given point in time, the huminate solution is added for a short period of time and its movement in the glass column is observed. The retardation of the acid solution in the aquifer compared to the flow rate of the ground water, as a rule, can be neglected. The selection position of the humic substance barrier can now be determined through the specific time difference between the addition of the huminate and the acid into the aquifer.

But, according to the process of the invention, it is also possible to place the reaction of the huminate solution with the acid solution into the region of the infiltration device if this appears necessary. This obviously has the disadvantage that the humic acid precipitation takes place directly in the infiltration devices and the immediately adjacent aquifer. This can have a disadvantageous effect on the usability of the infiltration devices because the ground water permeability of the aquifer is decreased by humic acid deposit in the aquifer.

With the process of the invention, humic substance impregnations of the aquifer can be attained at inaccessible sites at which, for example through superjacent construction, no possibility exists of directly applying measures on the aquifer with conventional means.

An effect of the humic substance impregnation of the aquifer is the decrease of the ground water permeability. However, of significantly greater importance is the sorptive capacity of the humic acid for heavy metals and organic ground water contaminants. The sorption capacity for organic substances is comparable to that of activated charcoal. The heavy metal sorption capacity equals even that of ion exchangers. Moreover, the precipitated humic substances offer a natural environment for the microorganisms present in the ground water which help thereby to accelerate the natural mineralization processes caused and induced biologically.

An attempt is frequently made, unsuccessfully, to place a closed humic substance barrier in the aquifer after a single huminate injection so that windows are generated in the aquifer in which no humic acid deposit is present. Or too low a humic acid deposit is present on the solid aquifer particles which still has an insufficient permeability reduction capacity and/or sorption capacity or whose sorption capacity has already been reached.

In these case, the aquifer can again be infiltrated with huminate solution via the present infiltration wells and can subsequently be infiltrated with the acid solution. Because the ground water selects the path of least resistance, the sites with the highest permeability during the subsequent impregnation, the open windows in the aquifer can preferably be impregnated.

In this respect with this method, the advantage is given of being able to influence under control at any time the aquifer situation as a function of the ground water quality.

As a natural product of the biotic metabolism and inorganic mineralization and humification processes, the humic substance barrier is also subject to natural degradative processes. This occurs particularly whenever the ground water contains oxygen. But even under these conditions, it can be expected that the humic substance barrier is only broken down over the course of centuries because it is itself a very stable intermediate product of natural breakdown processes and, consequently, is an essential component of natural soils. Through subsequent impregnation, the breakdown losses of the humic substance barrier can, however, be compensated again. In oxygen-deficient and oxygen-free aquifers, the life of the humic substance barrier is unlimited.

Even though measures known per se, such as the change of the direction of flow of the ground water or change of the levels of the ground water table, which is brought about through infiltration or pumping off of ground water or the setting of barriers such as slotted walls or the effect of underpressure or overpressure on the ground water table, the shape of the humic substance barrier formed the invention can be modified.

Through the humic substance barriers formed, the effectiveness of known processes, such as for example the UVB process of the IE GmbH Reutlingen, which strives for the vertical circulation of the ground water in the aquifer, can be improved and expanded.

Through the preferred vertical orientation of the humic substance barrier with respect to the direction of flow of the ground water, in those cases in which locally a toroidal topology of the ground water flow is generated through ground water circulation, humic substance barriers having largely a horizontal orientation can be generated.

Aqueous huminate solutions which can be used are alkaline or neutral solutions of humic acids or humic substances which are insoluble in an acid medium and which therefore are precipitated when the pH-value is decreased. Another possibility for precipitating the humic acids or humic substances resides in generating complexes with alkaline earth or heavy metal ions. Examples are either alkaline extracts of products comprising natural humic acids such as lignitic coals, mineral pigments or moor sludge or alkaline solutions of synthetic humic substances obtained through the oxidation of multivalent phenolic compounds in an alkaline medium.

All conventional mineral acids or water-soluble carboxylic acids can be used as acids. Preferred examples are hydrochloric acid or acetic acid. Acid salt solutions are aqueous solutions of salts of strong acids with weak bases which have an acid reaction in aqueous solutions through hydrolysis. To achieve the highest effective result and to avoid largely loading the ground water with acid, the amount of the acid or acid salts used should be dimensioned so that the quantity of the hydrogen ions corresponds to the quantity of the alkaline or ammonium ions of the huminates used.

Preferred metal precipitation agents are suitable aqueous solutions of alkaline earth metal and/or ferric (Fe-(III)) salts. As alkaline earth salts are in particular suitable calcium chloride, sulfate or bicarbonate.

A particular disadvantage of the process of the invention with the use of alkaline huminate solutions resides in that the ground water is enriched with salts resulting from the huminate-acid reaction. The type of the huminate cations and acid anions determines the type of salt contamination of the ground water. As a rule, this is a chloride contamination. But, if required, the salt-containing ground water can be pumped off for the short period of time of the occurrence of the contamination and in this way, ground water contamination can be avoided.

It is possible to generate in the acid huminate reaction, salts which can be broken down by selecting the salts developing during the formation of the humic substance barrier. Salts which can be broken down are, for example, ammonium acetate which can be broken down in oxygen-containing ground water to form water, nitrogen and carbonic acid.

A further possibility is the use of ammonium huminate without the addition of acid or salt-like amine-humic acid complexes, optionally together with organic and inorganic substances enhancing biotic metabolism. Through the biotic activity present in the aquifer, the formation of acid metabolic products or that of organisms breaking down organic or inorganic ammonium nitrogen is provoked, whereby the humic acid is precipitated even without acid addition without harmful salt concentrations being generated. Additionally, the natural formation and enrichment of organic carbon is induced from which can be generated over the course of time, additionally effective natural humic substances through the degradation of the debris.

It is also possible to combine the huminate injection with a silicate injection so that either a mixed aqueous silicate/huminate solution is used or that the silicate and huminate solutions are injected after an interval of time wherein either the silicate solution or the huminate solution is injected first. The huminate/silicate combination is used advantageously whenever the humic substance barrier is to be improved in its sorptive capacity with respect to its hydraulic sealing effect. As soluble silicates are preferably used sodium or potassium silicates or their mixtures. The amount of acid required for the formation of the humic substance barrier in this case must be increased by the acid fraction required for the precipitation of the silica gel.

It can be advantageous in some cases to introduce the humic substance solution not through injection pipes inserted vertically into the ground water conduit (aquifer) but rather from the surface through irrigation of the soil or via seepage channels. This method has the advantage that the solution of humic substance also impregnates the layers of soil above the aquifer so that here also humic substance can be precipitated through the acid agent introduced in the same way. This method is also advantageous in cases in which the soil layers above the aquifer, the spreading of contaminants, for example through soil-air adaptation through seepage channels or through high ground water levels, is prevented or at least reduced. In the soil above as well as within the aquifer itself, any large-area horizontal humic substance barriers can be generated with these measures, whose depths can extend from the upper edge of the ground over the entire thickness of the aquifer.

It is understood that it is also possible to combine the vertical introduction of the dissolved humic substances and acids into the soil with a horizontal introduction of them, thus via irrigation devices, seepage channels or seepage areas in order to combine, for example, vertical and horizontal humic substance barriers.

Various modifications of the barrier and process of the invention may be made without departing from the spirit or scope thereof and it is to be understood that the invention is intended to be limited only as defined in the appended claims.

What we claim is:

1. A process for generating a soil barrier in a ground water flow to prevent the spread of harmful substances in the soil or ground water by injecting an aqueous solution of humic acid or its alkali salts into the ground water flow followed by injecting an aqueous acid or salt solution into the ground water flow whereby the barrier is formed by precipitation of humic acid or its insoluble salts.

2. The process of claim 1 wherein the two solutions are introduced uniformly over the length of the barrier to be generated.

3. The process of claim 1 wherein the two solutions are introduced into the soil by perpendicular perforated injection pipes.

4. The process of claim 1 wherein the two solutions are introduced into the soil by at least one of the means selected from the group consisting of seepage channels, seepage areas and irrigation.

5. A soil barrier to prevent the spread of harmful substances in the soil or ground water based on humic substances precipitated in the soil formed by the process of claim 1.

* * * * *